United States Patent
Yamamoto et al.

[11] Patent Number: 5,851,022
[45] Date of Patent: Dec. 22, 1998

[54] AIR BAG PAD WITH DECORATIVE DEVICE

[75] Inventors: Tadashi Yamamoto, Aichi-ken; Chisato Masuya, Gifu; Norinari Nagata, Aichi-ken, all of Japan

[73] Assignee: Toyoda Gosei Co., Ltd., Aichi, Japan

[21] Appl. No.: 623,794

[22] Filed: Mar. 29, 1996

[30] Foreign Application Priority Data

Mar. 31, 1995 [JP] Japan ..................................... 7-076427
Dec. 27, 1995 [JP] Japan ..................................... 7-340455

[51] Int. Cl.$^6$ .................................................. B60R 21/20
[52] U.S. Cl. ............................................................ 280/728.3
[58] Field of Search ............................... 280/728.3, 731, 280/732, 728.2; 293/128

[56] References Cited

U.S. PATENT DOCUMENTS

| | | | |
|---|---|---|---|
| 3,359,030 | 12/1967 | Newman | 293/128 |
| 4,364,591 | 12/1982 | Bien | 293/128 |
| 5,186,490 | 2/1993 | Adams et al. | 280/728.3 |
| 5,487,557 | 1/1996 | Eckhout | 280/728.3 |
| 5,580,082 | 12/1996 | Shiga et al. | 280/728.3 |
| 5,685,056 | 11/1997 | Fischer | 280/728.3 |

FOREIGN PATENT DOCUMENTS

| | | | |
|---|---|---|---|
| 1-81351 | 5/1989 | Japan . | |
| 3-103851 | 10/1991 | Japan . | |
| 5-139231 | 6/1993 | Japan | 280/728.3 |

*Primary Examiner*—Peter C. English
*Attorney, Agent, or Firm*—Pillsbury Madison & Sutro LLP; Cushman Darby & Cushman IP Group

[57] ABSTRACT

A pad covering an air bag has a main body, a backing and a decorative member. The main body may be made from a thermoplastic elastomer and includes a tearing line which tears open when the air bag inflates, a recess formed in its outer surface spaced apart from the tearing line, and a hole formed in the recess and extending between the outer and inner surfaces of the body. The decorative member is arranged in the recess and the hole. The backing is situated on the inner surface of the main body, and has a through hole aligned with the hole of the main body. The decorative member has a decorative plate portion fitted in the recess of the main body, and a support post extending from the inner surface of the decorative plate portion and through the holes of the main body and the backing, and connected to the backing. The inner surface of the main body spaced apart from its hole and the outer surface of the backing facing the main body have mutually engaging portions which prevent the backing from being displaced along the inner surface of the main body. The main body of the pad provides a stable support for the decorative member, even though the thermoplastic elastomer is an easily expandable material.

4 Claims, 4 Drawing Sheets

5,851,022

AIR BAG PAD WITH DECORATIVE DEVICE

BACKGROUND OF THE INVENTION

1. Field of the Invention

This invention relates to a pad in an air bag device which is mounted in an automobile, for example, on the steering wheel, or on a door or seat, or in front of the front passenger's seat. More particularly, it relates to a pad carrying a decorative member, such as an emblem, on its surface. The pad covers an air bag and breaks open to allow the air bag to jut out when it is inflated.

2. Description of Related Art

An air bag device is generally known having a pad carrying a decorative member on its surface, as disclosed in Japanese Utility Model Laid-Open publication No. Hei 1-81351. The pad comprises a main body formed from a soft synthetic resin and carrying the decorative member thereon, and a net insert embedded in the main body. The decorative member is sewn to the net insert with an elastic thread. Elastic thread is used to ensure that the decorative member remains fastened to the main body of the pad, even when the pad expands and breaks open when the air bag inflates.

In addition, a pad is known which has a main body formed from a single layer of a thermoplastic elastomer, such as polyolefin or styrene elastomer, and without a net insert. This type of pad is generally less expensive to manufacture. The pad body which is made from a thermoplastic elastomer is, however, more expandable than the known one having an embedded net insert. Its expandability makes it impossible to fasten a decorative member to it by sewing, since the sewn portion of the pad body is likely to break because of the expansion, and its breaking results in the detachment of the decorative member.

In this connection, an improved structure is proposed in Japanese Utility Model Laid-Open publication No. Hei 3-103851. It employs a support post formed like a split pin to attach a decorative member to the main body of a pad. In connection with this use of a single post, instead of a plurality of posts, this Japanese application says that if the pad body has a plurality of holes for anchoring such a plurality of posts, it is likely that the pad body may expand to different degrees at different locations on the pad body. Therefore, one or more of the holes may fail when the pad body is broken or torn along a tearing line to allow the inflation of an air bag. On the other hand, the pad body having a single hole for anchoring a single support post is less likely to break around the hole and allow the detachment of the post, when the pad body is torn along the tearing line, since it is unlikely to receive different levels of strain around the hole.

The decorative member shown in the above-mentioned Japanese application (3-103851) is, however, situated in the tearing line on the pad body in order to cover a through hole therein. The tearing line is located in the region of the pad body which is the most stretched before tearing when the air bag is inflated. Moreover, this same region moves most rapidly by opening or contracting after tearing. Therefore, the decorative member has so large a moment of inertia when the pad body is torn along the tearing line that it becomes detached if the pad body is stretched and broken around the hole in which the post supporting the decorative member is anchored.

SUMMARY OF THE INVENTION

It is an object of this invention to provide a pad for an air bag device having a main body which is formed by a single expansible layer of a thermoplastic elastomer, but which also improves the stability of a decorative member attached to it.

This object is attained by providing a pad for an air bag device which comprises a main body, a backing, and a decorative member. The main body of the pad is preferably formed from a thermoplastic elastomer and has a tearing line along which the main body is torn open to allow the inflated air bag to protrude. The main body also has a recess situated in its surface, away from the tearing line, for mounting the decorative member, and a through hole located in the recess. The through hole extends between the inner and outer surfaces of the main body. The backing is situated on the inner surface of the main body and has a through hole aligned with the through hole in the main body. The decorative member has a decorative plate portion secured to the main body by the backing and is fitted in the recess of the main body. The decorative member also has a support post which extends from the inner surface of the decorative plate portion, through the through holes of the main body, and which connects with the backing. The inner surface of the main body, away from its through hole, and the outer surface of the backing additionally have mutually engaging portions which prevent the backing from being displaced along the inner surface of the main body.

Thus, the decorative member is spaced away from the tearing line. Therefore, the expansion of the main body along its tearing line as a result of the inflation of the air bag minimally reaches the region around the through hole in which the support post of the decorative member is inserted.

The decorative member has only a single support post. The main body of the pad therefore has only a single hole for receiving the support post. Therefore, the tearing of the main body along the tearing line is unlikely to exert any strain on the main body around the through hole that might cause splitting therearound.

The backing is prevented from being displaced along the main body by the mutually engaging portions on the main body and on the backing, while the decorative member is held against displacement by fitting the decorative plate portion in the recess provided in the surface of the main body. Therefore, the expansion of the along the tearing line is unlikely to extend to the region around the through hole.

Thus, the pad of this invention improves the mounting stability of the decorative member attached to its main body, as hardly any undesirable expansion occurs around the through hole in which the decorative member is supported even though its main body is of a single expandable layer of a thermoplastic elastomer.

The object of this invention is also attained by a pad in which the mutually engaging portions as described above are replaced by a protruding portion projecting inwardly from the inner surface of its main body. Therefore, the wall thickness of the main body around the through hole in which the decorative member is supported may be made substantially equal to the wall thickness around the recess in which the decorative plate portion is fitted. The protruding portion compensates for the reduced wall thickness of the main body around the through hole, which is due to the presence of the recess. Therefore, the expansion of the main body near its tearing line (due to inflation of the air bag) minimally extends to the portion around the through hole in which the decorative member is supported.

The pad according to this invention may of course have both mutually engaging portions and protruding portions as described above.

DESCRIPTION OF THE PREFERRED EMBODIMENTS

This invention will now be described with reference to the drawings, which illustrate several embodiments of the invention. It is to be understood, however, that the following description and the accompanying drawings are not intended to limit the scope of this invention. Rather, variations or modifications may be made without departing from the scope of this invention which is defined by the appended claims.

Figure 1:
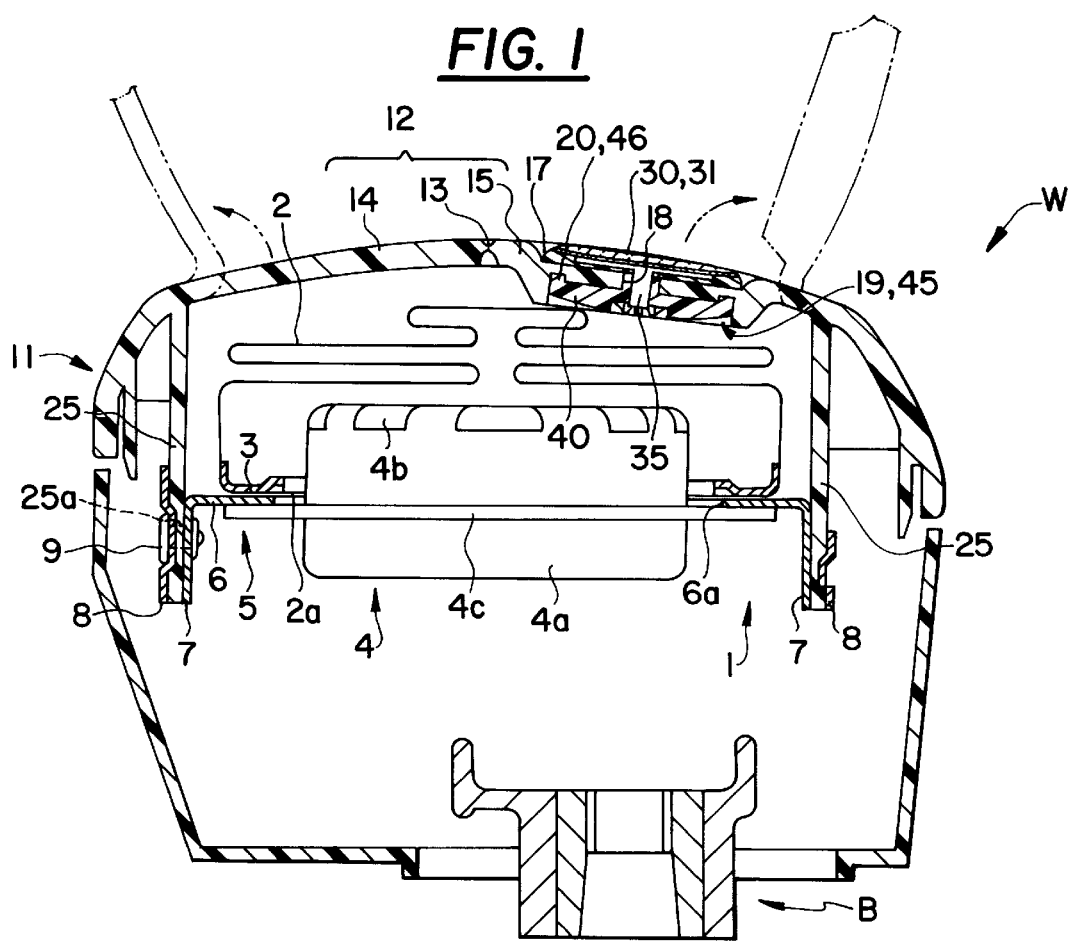
FIG. 1 is a cross sectional view of an air bag device including a pad embodying this invention.

A pad 10 embodying this invention is employed in an air bag device 1, as generally shown in FIG. 1. The air bag device 1 is mounted on the top of the central boss B of a steering wheel W. The air bag device 1 further includes an air bag 2, an inflator 4, and a bag holder 5.

The air bag 2 has an opening 2a at its bottom, and is normally held in its folded form. The inflator 4, which is used to supply the air bag 2 with gas for inflation, comprises a cylindrical main body 4a and a flange 4c. The main body 4a has at least one gas outlet 4b at its top. The flange 4c projects radially outward from the periphery of the main body 4a. The bag holder 5 holds the air bag 2, inflator 4, and pad 10. The bag holder 5 has bottom wall 6 and a side wall 7. The bottom wall 6 has a central hole 6a, through which the main body 4a of the inflator is inserted from below. The side wall 7 is formed, for example, by a plurality of portions extending downwardly from the edge of the bottom wall 6.

An annular retainer 3 is used to attach the air bag 2 and the inflator 4 to the bag holder 5. The retainer 3 is located inside the air bag 2 along the edge of its opening 2a. The retainer 3 is adapted to receive a number of fasteners, such as bolts (not shown) extending downwardly, through the edge of the air bag around its opening 2a, through the edge of the bottom wall 6 of the bag holder around its central hole 6a, and through the flange 4c of the inflator 4. For example, the bolts cooperate with nuts to fasten the air bag 2, the inflator 4 and the bag holder 5 together.

The pad 10 has a downwardly extending side wall 25 which is fastened to the side wall 7 of the bag holder 5, with, for example, rivets 9, so that the pad 10 is secured to the bag holder 5. A back plate 8 may be interposed between each rivet 9 and the side wall 25, as seen in FIG. 1.

The pad 10 includes a main body 11 covering the air bag 2, a decorative member 30, and a backing 40 for fastening the decorative member 30 in place. The main body 11 of the pad, also referred to herein as the pad body, is preferably formed from a thermoplastic elastomer, such as a polyolefin or a styrene elastomer. The pad body 11 has a ceiling, or top wall, 12 and a side wall 25. The top wall 12 covers the top of the folded air bag 2 and carries the decorative member 30 thereon. The side wall 25 is generally in the form of a square box extending downwardly from the top wall 12. The side wall 25 has a plurality of appropriately spaced apart holes 25a through which the rivets 9 are passed to fasten the pad 10 to the bag holder 5.

Figure 2:
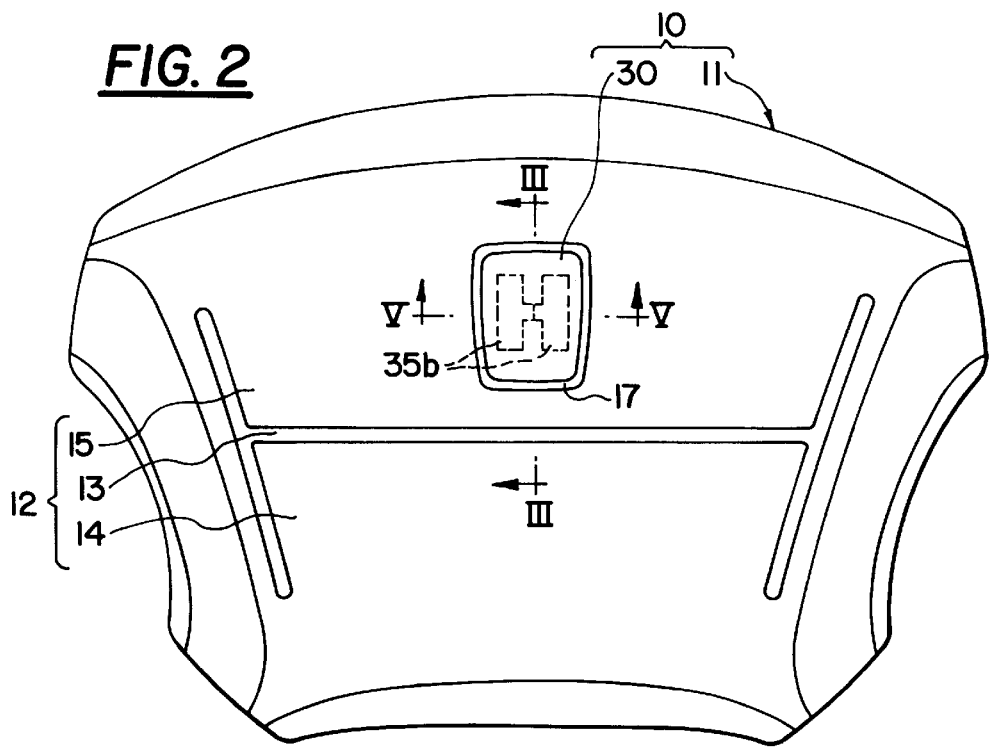
FIG. 2 is a top plan view of the pad shown in FIG. 1.

The top wall 12 has a tearing line 13 which may be, for example, H-shaped or I-shaped, and which has a reduced thickness, as shown in FIGS. 1 and 2. Therefore, upon inflation of the air bag 2, the top wall 12 tears along the tearing line 13 into two door or flap portions 14 and 15, which open like a double-leafed hinged door.

Figure 3:
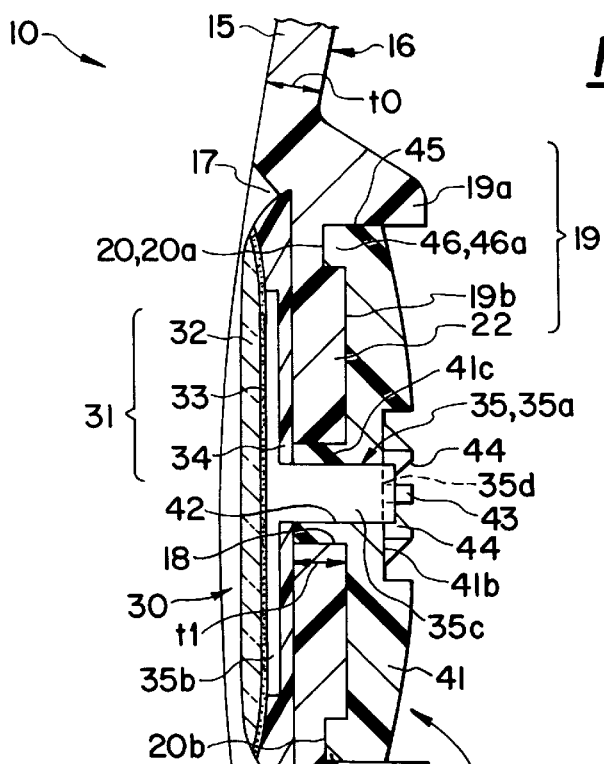
FIG. 3 is an enlarged, partial cross sectional view, taken along the line III—III of FIG. 2.

The door portion 15 is located on the front side of the steering wheel W and has a recess 17, as shown in FIGS. 1 to 3, in which the decorative plate portion 31 of the decorative member 30 is fitted, as is described later in further detail. The recess 17 is spaced apart from the tearing line 13. In the center of the recess 17, a through hole 18 extends through the top wall 12. The through hole 18 is preferably circular, so that no stress concentrations occur at any part of its circumference.

Figure 4:
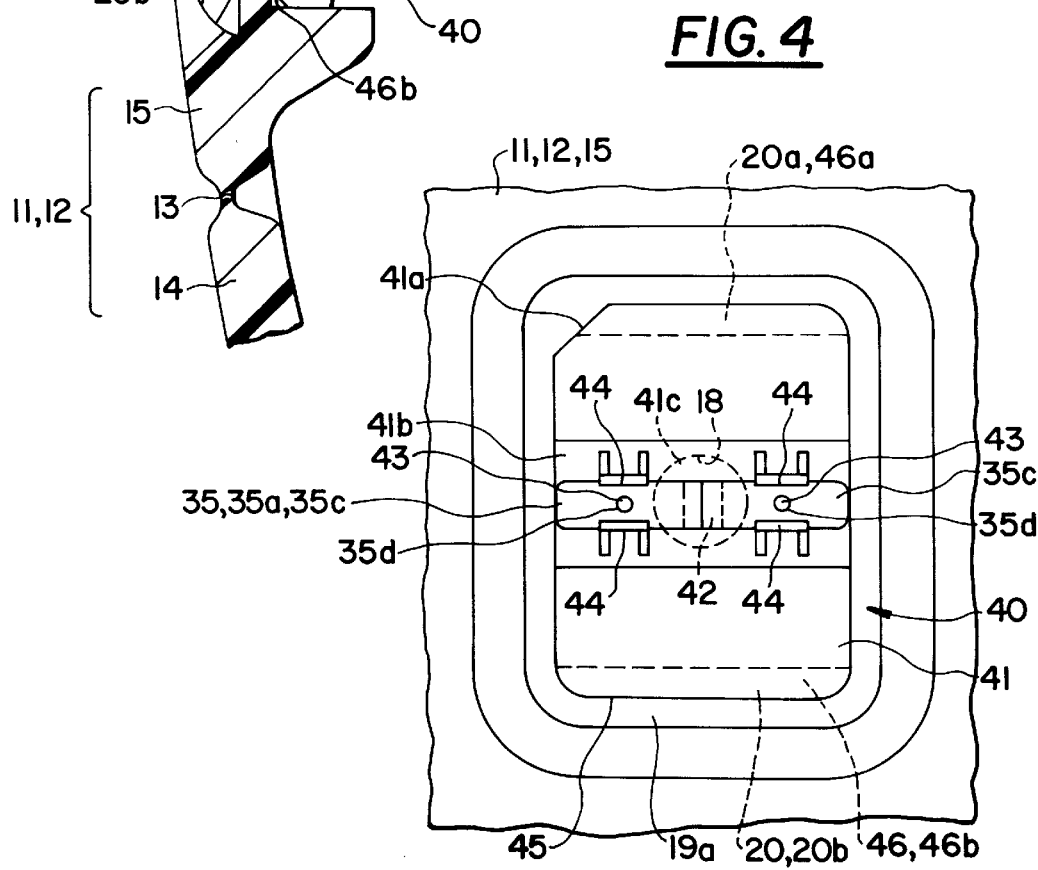
FIG. 4 is a bottom partial plan view of the pad shown in FIG. 3.
Figure 5:
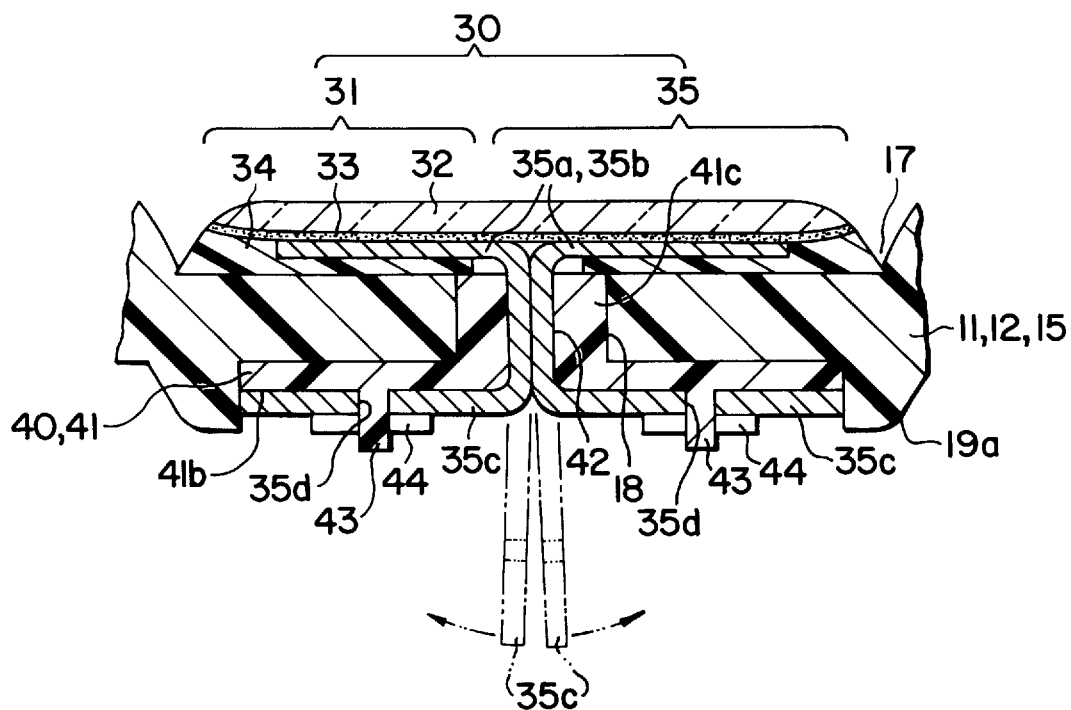
FIG. 5 is an enlarged, partial cross sectional view taken along the line V—V of FIG. 2.

The pad body 11 has two engaging portions 19 and 20 which are formed on the back, or inner, surface of the door portion 15 and which are spaced apart from the through hole 18, as shown in FIGS. 3 to 5. The engaging portions 19 and 20 engage the backing 40. The engaging portion 19 includes a concavity 19b and a ridge 19a at a periphery thereof. The backing 40 has a main portion 41 fitted in the concavity 19b. The ridge 19a extends in a substantially square shape along the outer edge of the main portion 41, as seen in FIG. 4. The engaging portion 20 includes two grooves 20a and 20b extending along the ridge 19a on opposite sides of the concavity 19b.

The concavity 19b has a slightly protruding portion 22 formed. Around the through hole 18, the protruding portion 22 has a wall thickness t1 which is substantially equal to the wall thickness t0 of the remaining portion 16 of the pad body 11, around the recess 17. The wall thickness t0 or t1 may, for example, be about 5 mm. The wall thickness t1 of the protruding portion 22 can, however, be thinner by, for example, about 2 mm, than the wall thickness to of the remaining portion 16 without reducing the stable support of the decorative member 30.

The decorative member 30 includes decorative plate portion 31 and a support post 35 as shown in FIGS. 3 to 5. The decorative plate portion 31 is a substantially flat (and, for example, rectangular) plate fitted in the recess 17 of the pad body 11. The plate portion 31 has a potting layer 32, a decorative layer 33 formed by plating or the like, and a base 34. The potting layer 32 defines the outer surface of the decorative plate portion 31. The base 34 is formed from a hard synthetic resin, such as acrylonitrile-butadiene-styrene (ABS), and has an embossed surface showing certain characters, such as a company logo.

The support post 35 extends from the center of the back surface of the decorative plate portion 31, through the through hole 18, and through a through hole 42 in the backing 40. The support post 35 is, in part, bent over the back surface of the backing 40, so as to attach it to the backing 40. The support post 35 is preferably in the form of a split pin and includes two leg members 35a, each formed from, for example, a steel plate. Each leg member 35a includes a head portion 35b (see FIGS. 2, 3 and 5) and a main leg portion 35c bent and extending from the head portion 35b embedded in the base 34. Each main leg portion 35c has a hole 35d at or adjacent to its end and in which a projection 43 protruding from the backing 40 is engaged, as will be described in further detail. The leg members 35a have their head portions 35b embeddingly fixed when the base 34 is molded, so as to be united with the decorative plate portion 31 (see, for example, FIG. 5).

The backing 40 is formed from a hard synthetic resin, such as ABS, and is disposed on the back, or inner surface of the top wall 12 of the pad body. The backing 40 comprises a main portion 41 in the form of a substantially rectangular plate preferably having a beveled corner 41a, as shown in FIG. 4. The main portion 41 has at its center a rectangular through hole 42 through which the main leg portions 35c extend. The backing 40 also has a cylindrical sleeve 41c projecting from the outer surface of the main portion 41, surrounding the through hole 42. The sleeve 41c is fitted in the through hole 18 of the pad body 11. The sleeve 41c keeps the main leg portions 35c from contacting the inner wall of the through hole 18.

The main portion 41 has a pair of projections 43 which protrude from its inner surface and engage the holes 35d formed in the main leg portions 35c. The main portion 41 also has a pair of pawls 44 which engage the edges of the main leg portions 35c when the main leg portions 35c are bent away from each other. The projections 43 and the pawls 44 are formed in a groove 41b formed in the inner surface of the main portion 41.

The main portion 41 has also a pair of ridges 46a and 46b, along opposite edges of its outer surface. The ridges 46a and 46b are fitted in the grooves 20a and 20b, respectively. The outer edge of the main portion 41 defines an engaging portion 45 engaging the engaging portion 19 of the pad body 11.

When the decorative member 30 is attached, the engaging portion 45 and ridges 46a and 46b are first engaged with the engaging portions 19 and 20 on the inner surface of the pad body 11. In other words, the main portion 41 is fitted in the concavity 19b, while the ridges 46a and 46b are fitted in the grooves 20a and 20b, respectively. The sleeve 41c is fitted in the through hole 18. The backing 40 is thereby mounted on the inner surface of the pad body 11.

Then, the main leg portions 35c of the support post 35 are passed through the through hole 18 in the pad body 11 and the through hole 42 in the backing 40. The decorative plate portion 31 is then fitted in the recess 17. Then, the main leg portions 35c are bent away from each other, as shown in FIG. 5, and the projections 43 are passed through respective holes 35d. Both edges of the main leg portions 35c are held in place by the pawls 44 against the inner surface of the backing 40. Thus, the support post 35 is united with the backing 40, and as a result, the decorative member 30 is secured to the pad body 11.

Referring now to the assembly of the air bag device 1, the retainer 3 is first put inside the air bag 2 and the air bag 2 is folded. Then, the main body 4a of the inflator is inserted into the hole 6a from below. The bolts (not shown) of the retainer 3 are passed through the bottom wall 6 of the bag holder and through the flange 4c of the inflator, and held in position by nuts. Then, the pad 10 carrying the decorative member 30 is placed over the folded air bag 2, and its side wall 25 is fastened to the side wall 7 of the bag holder with rivets 9. The air bag device 1 is thus assembled.

The air bag device 1 is conventionally mounted on the steering wheel W by an attachment structure on the side wall 7 of the bag holder (not shown), and the steering wheel W is conventionally mounted in an automobile. When gas is discharged through the at least one gas outlet 4b of the inflator 4, the air bag 2 is inflated. The inflated air bag 2 expands the pad until the pad tears open along the tearing line 13. The door portions 14 and 15 open, and the inflated air bag 2 emerges therefrom.

Because the decorative member 30 is spaced apart from the tearing line 13 on the pad 10, the expansion of the pad along the tearing line during inflation of the air bag 2 minimally extends to the region around the through hole 18 in which the main leg portions 35c of the support post 35 and the sleeve 41c of the backing 40 are inserted. Moreover, the substantially square, thickened ridge 19a surrounding the through hole 18 restrains the pad from expanding at the region surrounded by the ridge 19a. This makes it even more unlikely for the pad to expand around the through hole 18.

Moreover, because only a single through hole 18 is employed for receiving the main leg portions 35c, tearing of the pad along the tearing line 13 is unlikely to produce any strain around the hole 18 that might cause the pad to break around the through hole 18.

According to another important feature of this invention, the pad includes a number of mutually engaging arrangements formed on the inner surface of the pad body 11, spaced apart from the hole 18, and on the outer surface of the backing 40, i.e., the ridge 19a and the concavity 19b, and the grooves 20a and 20b; the engaging portion 45 engaging the engaging portion 19; and the ridges 46a and 46b fitted in the grooves 20a and 20b. These arrangements prevent the backing 40 from being displaced along the inner surface of the pad body 11.

The mutual engagement between the inner surface of the pad body 11 and the outer surface of the backing 40, and the engagement of the decorative plate portion 31 in the recess 17 of the pad body 11 prevent displacement of the decorative member 30 and the backing 40 relative to the recess 17. As a result, the expansion of the pad along the tearing line 13 is even more unlikely to reach the region around the through hole 18. Thus, the pad 10 supports the decorative member 30 with improved stability, as the pad body 11 is less likely to expand around the through hole 18, even though it is made from a single layer of an expansible thermoplastic elastomer.

The support post 35 is united with the backing 40 by the main leg portions 35c bent along the backing 40 and held by the pawls 44, and by the projections 43 engaged in the holes 35d, as described above. Therefore, the inflating air bag 2 does not detach the support post 35 from the through hole 42 of the backing 40 or the through hole 18 of the pad body 11. This arrangement imparts an even more improved mounting stability to the decorative member 30.

Moreover, the ridge 19a surrounds the backing 40 and has a protruding height which is substantially equal to those of the pawls 44 on the backing 40, the main leg portions 35c, etc. Therefore, the ridge 19a makes it unlikely for the expanding air bag 2 to interfere with the backing 40 or the main leg portions 35c, thereby damaging them during inflation of the air bag.

Figure 8:
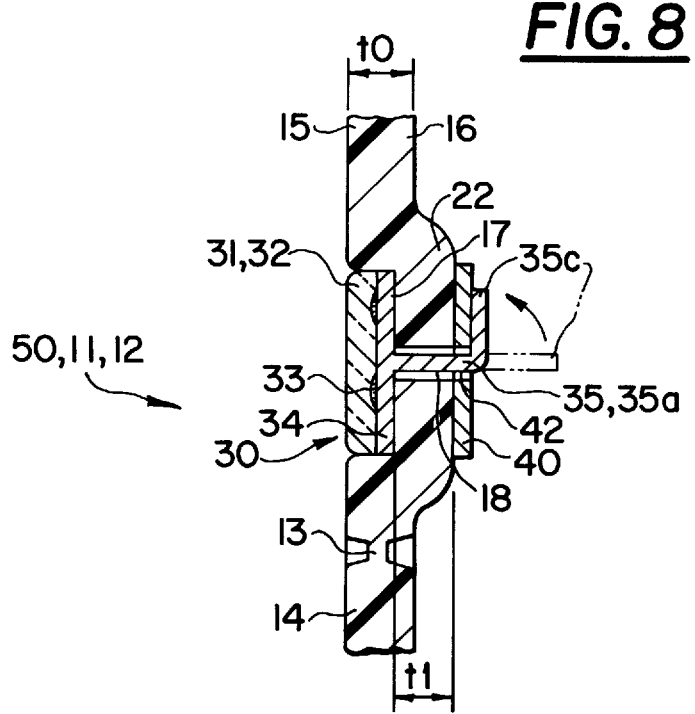
FIG. 8 is a cross sectional view of a part of yet another form of pad embodying this invention.

Although the support post 35 has been described as a pair of leg members 35a like a split pin, it can be alternatively formed by a single leg member 35a, as shown in FIG. 8. Moreover, a post like a split pin, or like a single pin, may be formed as a protruding part of the base 34, as shown in FIG. 8, if the base 34 is made from a metallic material. Of course, the support post 35 can be formed separately from the base 34 and joined to the base 34 by welding, thermal fusion, adhesive, deforming, etc.

Although the support post 35 has been described as being bent along the backing 40 to be thereby held, the support post could alternatively be a bolt or a rivet passed through the through hole 42, and held by a nut, or flattened, on the inner surface of the backing 40.

Although two sets of mutually engaging portions have been described as being formed on the inner surface of the pad body 11, spaced apart from the through hole 18, and the outer surface of the backing 40, these engaging portions can be eliminated in favor of any suitable manner of preventing the backing 40 from being displaced along the inner surface of the pad body 11.

Figure 6:
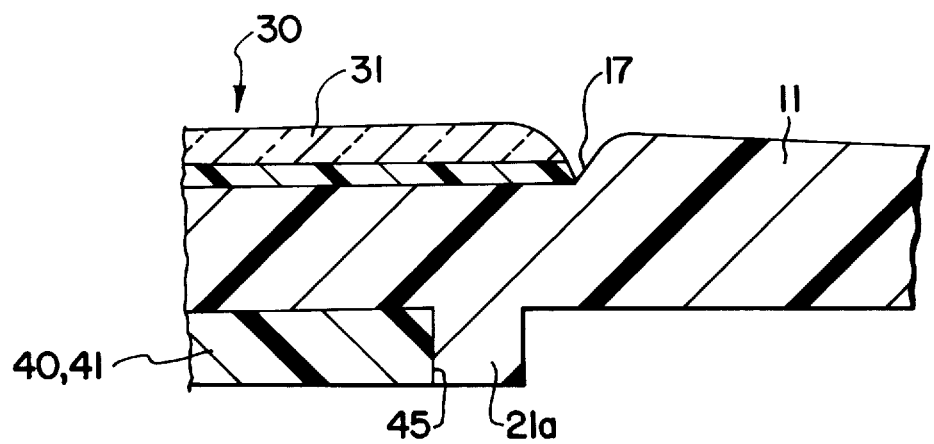
FIG. 6 is a cross sectional view of a part of another form of pad embodying this invention.

Thus, it is also possible to provide a protrusion 21a engaging the outer edge 45 of the backing 40 continuously or discontinuously, as shown in FIG. 6 on the pad body 11 on its inner surface, spaced apart from the through hole 18. The protrusion 21a defines the engaging portion of the pad body 11, while the outer edge 45 of the backing 40 defines its corresponding engaging portion. As a modified form of the structure shown in FIG. 6, it is possible to form a plurality of concavities in the outer surface of the backing 40, while the inner surface of pad body 11 is provided with a plurality of projections each fitted in one of the concavities.

Figure 7:
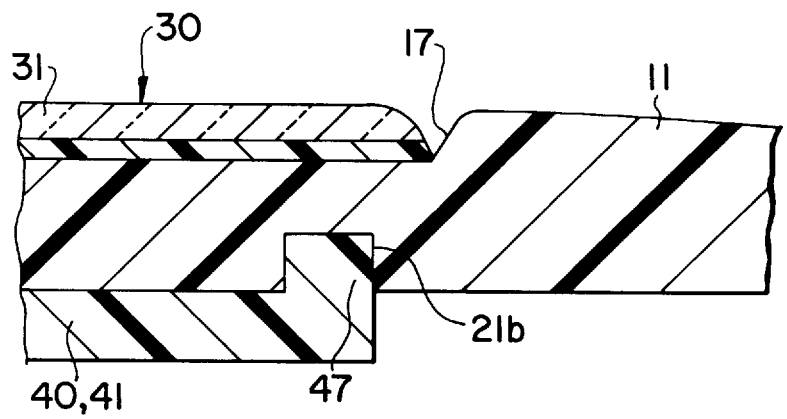
FIG. 7 is a cross sectional view of a part of still another form of pad embodying this invention.

As a further alternative, it is possible to provide the backing 40 with one or more projections 47 protruding from its outer edge portion, while the pad body 11 is provided with a concavity 21b in its inner surface in which the projection (or projections) 47 is fitted, as shown in FIG. 7. The concavity 21b defines the engaging portion of the pad body 11, while the projection 47 of the backing 40 defines its engaging portion.

The construction as shown in FIG. 8 may be employed for a pad not having any engaging portions. The main body 11 of the pad 50 shown in FIG. 8 has a rearwardly or inwardly projecting protrusion 22 around the through hole 18. The protrusion 22 has a wall thickness t1 around the through hole 18 which is substantially equal to the wall thickness to of the remaining portion 16 around the recess 17. The wall thickness t0 or t1 may, for example, be 5 mm. The wall thickness t1 of the protrusion 22 can, however, be thinner, by, for example, about 2 mm, than the wall thickness to of the remaining portion 16 without detracting from the stable support of the decorative member 30.

The protrusion 22 compensates for any reduction in wall thickness of the pad body 11 due to the presence of the recess 17 by maintaining the wall thickness t1 around the hole 18 in which the decorative member 30 is supported. Therefore, the expansion of the pad body along the tearing line 13 during inflation of the air bag is unlikely to affect the region around the through hole 18. Thus, the pad body 11 provides improved mounting stability for the decorative member 30, as undesirable expansion is unlikely to occur around the through hole 18, though it is of a single layer of an expansible thermoplastic elastomer which is expansible.

Of course, a pad may be provided with both the engaging portions and a protrusion 22, as is the case with the pad 10 shown in FIG. 3.

Although the pad 10 or 50 has been described as being mounted on a steering wheel W, this invention is also applicable to a pad for an air bag device mounted in front of the front passenger's seat, on a door, or on another seat, etc.

While the invention has been described in connection with what is presently considered to be the most practical and preferable embodiments, it is to be understood that the invention is certainly not limited to these disclosed embodiments, but, on the contrary, is intended to cover various modifications and equivalent arrangements included within the spirit and scope of the appended claims.

What is claimed is:

1. A pad covering an air bag in an air bag device, the pad comprising:

a main body having a size and a configuration sufficient to cover the air bag and being provided with a tear line, a recessed area formed in an exterior surface thereof and being spaced away from said tear line, and a first through hole formed in said recessed area and extending from said exterior surface of said main body to an interior surface thereof;

a backing portion arranged on said interior surface of said main body and having a second through hole formed therethrough, said first and second through holes being aligned with one another;

a decorative member comprising a decorative plate portion and a support post extending from a surface of said plate portion, wherein said decorative member is arranged so that said plate portion is received in said recessed area and said support post is inserted into said first and second through holes, said support post being fixed to said backing portion;

wherein said interior surface of said main portion and said backing portion are provided with mutually engaging first and second engaging portions, respectively;

wherein said support post includes an end portion which protrudes from said second through hole and which is bent back along said backing portion; and wherein said backing portion includes a pawl portion constructed and arranged to retain said end portion along said backing portion.

2. A pad covering an air bag in an air bag device, the pad comprising:

a main body having a size and a configuration sufficient to cover the air bag and being provided with a tear line, a recessed area formed in an exterior surface thereof and being spaced away from said tear line, and a first through hole formed in said recessed area and extending from said exterior surface of said main body to an interior surface thereof;

a backing portion arranged on said interior surface of said main body and having a second through hole formed therethrough, said first and second through holes being aligned with one another;

a decorative member comprising a decorative plate portion and a support post extending from a surface of said plate portion, wherein said decorative member is arranged so that said plate portion is received in said recessed area and said support post is inserted into said first and second through holes, said support post being fixed to said backing portion;

wherein said interior surface of said main portion and said backing portion are provided with mutually engaging first and second engaging portions, respectively;

wherein said support post includes an end portion which protrudes from said second through hole and which is bent back along said backing portion; and wherein said end portion is provided with a hole formed therethrough and said backing portion has a projection provided thereon, said end portion being bent along said backing portion such that said projection is received in said hole.

3. A pad covering an air bag in an air bag device, the pad comprising:

a main body having a size and a configuration sufficient to cover the air bag and being provided with a tear line, a recessed area formed in an exterior surface thereof and being spaced away from said tear line, and a first through hole formed in said recessed area and extending from said exterior surface of said main body to an interior surface thereof;

a backing portion arranged on said interior surface of said main body and having a second through hole formed therethrough, said first and second through holes being aligned with one another;

a decorative member comprising a decorative plate portion and a support post extending from a surface of said plate portion, wherein said decorative member is arranged so that said plate portion is received in said recessed area and said support post is inserted into said first and second through holes, said support post being fixed to said backing portion;

wherein said interior surface of said main portion and said backing portion are provided with mutually engaging first and second engaging portions, respectively; and wherein said interior surface of said main body includes a ridge portion substantially surrounding said backing portion.

4. A pad according to claim 1, wherein said ridge portion has a height substantially the same as an end portion of said support post which protrudes from said second through hole and which is bent back along said backing portion.

* * * * *